UNITED STATES PATENT OFFICE.

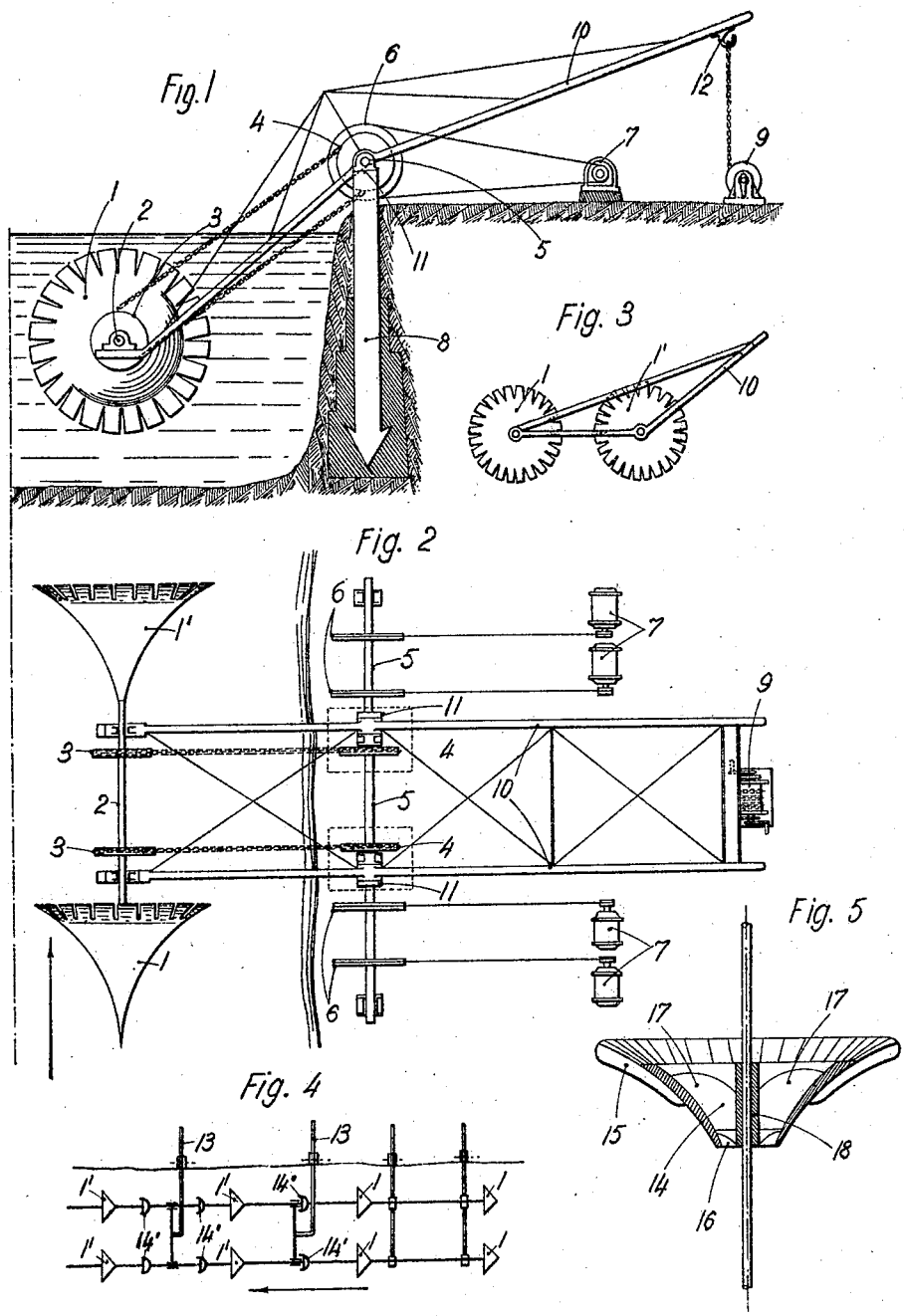

JEAN PLANCHE, OF PARIS, FRANCE.

HYDRAULIC MOTOR.

1,413,188.   Specification of Letters Patent.   Patented Apr. 18, 1922.

Application filed July 29, 1920. Serial No. 399,734.

(GRANTED UNDER THE PROVISIONS OF THE ACT OF MARCH 3, 1921, 41 STAT. L., 1313.)

*To all whom it may concern:*

Be it known that I, JEAN PLANCHE, engineer, citizen of the French Republic, residing at Paris, Department of the Seine, in France, and having P. O. address 32 Rue de Londres, in the said city, have invented certain new and useful Improvements in Hydraulic Motors, for which I have filed application in France, 24 July, 1919, and 12 Feb., 1920; Switzerland, 12 Dec., 1919; Denmark, 24 Dec., 1919; Norway, 30 Dec., 1919; Germany, 10 June, 1920; and I do hereby declare the following to be a full, clear, and exact description of the invention, such as will enable others skilled in the art to which it appertains to make and use the same.

The present invention has reference to an hydraulic motor arranged to utilize the live force of a river or stream without having recourse to dams or other similar means for the retention of water.

The accompanying drawings, which represent diagrammatic views, will enable it to be understood how the invention can be utilized practically.

In the drawings:

Fig. 1 is an elevation of a complete plant comprising the motor and its transmission gearing or shafting.

Fig. 2 is a plan view of the same installation.

Fig. 3 is a diagrammatic view of a modification of the motor.

Fig. 4 shows a complete group of coupled motors.

Fig. 5 shows a method of construction of the rotors or turbine.

At the end of a pair of lever arms or supports comprising a frame 10 adapted to oscillate by means of a shaft 5 in bearings 11 placed on the top of monoliths or pillars 8—8 lodged or bedded upon the steep bank of a river or watercourse, two rotors or turbines 1 and 1 of special form are mounted, of which mention will hereinafter be made. These rotors are rigidly attached to a shaft 2 rotating in bearings of a suitable type mounted upon the lower end of the frame 10. Upon this shaft there are keyed transmission pulleys 3—3 which, by means of a chain or other suitable device, impart their movement of rotation to the pulleys 4—4 keyed upon the shaft 5. On the extensions of this shaft, on the outside of, or beyond the bearings 11 are keyed pulleys 6—6 two on each side in the example given, which serve to operate dynamos 7—7 by means of belting or other suitable transmission. Upon the transoms, which connect the upper ends of the lever arms or supports of the frame 10, there is a hook 12 around which is passed a chain 7 adapted to be wound up on a winch 9. This arrangement permits of the regulation of the immersion of the rotors in the river. The whole of the shaftings and dynamos could, of course, be inclosed in a hall or chamber not shown in the drawings. The transmission gear to the dynamos is merely given by way of example but, as will readily be understood, the force or energy may be utilized in any suitable manner The rotors, forming the object of the invention, comprise a cone of revolution with a generatrix curve, at the base of which there is fixed a certain number of vanes, the number of which will depend upon the results which it is desired to obtain with a current having a given speed.

The apex or point of the cone is of course placed so as to face the current, as shown by the arrow, and in order that the second rotor should give good results it is necessary that the distance of the down-stream rotor should be sufficiently large in relation to that of the up-stream rotor, the vanes being of the radiating or slightly curved type.

If desired, and provided the width of the river or watercourse permits of it, two rotors 1 and 1' at a slight distance from each other may be placed on the supporting frame 10 as shown in Fig. 3 and, also if desired, as many as three could even be used.

The regulation of the depth of immersion of the rotors could, as will be apparent, be also effected automatically assuming that conditions are such as to obtain constant work. It will even be well to be able to cause the rotors to be entirely withdrawn from the water should work be intermittent or in the event of any repairs being necessary. If, in certain cases, the width of the canal or the weakness of the current should not permit of the realization of the necessary power with the arrangement described having two or four motors, it will be possible to couple with Cardan gearing to the shafts of the first arrangement, composed of four rotors 1, 1, 1, 1 (Fig. 4), other shaft extensions carrying the rotors 1', 1', 1', 1', and these shafts will be supported either by floats or by transom beams 13—13 fixed to the bank and maintained in position by means of transoms between each joint 14', of each line of shafting.

Fig. 5 shows a structural form of rotor comprising a cone 14 with a generatrix curve to which the vanes 15 are attached. The apex of the cone 14 is cut over a certain extent of its length so as to form at 16 an aperture for the passage of the water, the result of such aperture being to break up those eddies which are formed to the rear of the cone.

The webs or radii 17 connecting the cone 14 to its base 18 are of the same general form as the wings or vanes 15 of the rotor; resulting in an increased utilization of the water current, the said radii adding their effect to that of the vanes of the motor.

The vanes 15 which, of course, always form a part of the cone 14, are not placed direct in its prolongation, but are attached to the periphery as clearly indicated.

Claims:

1. In a hydraulic motor, the combination with a support, of a rotor mounted on the lower end of said support adapted to be submerged in a watercourse, the said rotor comprising a cone, having a generatrix curve, a crown of vanes carried by the base of said cone adapted to be acted upon by the passing water or current of said water course for rotating said cone and means for transmitting the power generated by said rotation.

2. In a hydraulic motor the combination with a pivoted support, of a rotor mounted on the lower end of said support adapted to be submerged in a watercourse, means for regulating the submerged depth thereof, the said rotor comprising a cone having a generatrix curve, a crown of vanes carried by the base of said cone and secured to the outside thereof, a portion of the apex of said cone being removed providing a central passage, webs or vanes formed in the interior of said cone, whereby means are provided to be acted upon by the water as it passes outside of and through the cone for rotating said cone and means for transmitting the power generated by said rotation.

In testimony whereof I affix my signature, in presence of a witness.

JEAN PLANCHE.

Witness:
CLEMENT S. EDWARDS.